(12) United States Patent
Taira

(10) Patent No.: US 6,415,098 B1
(45) Date of Patent: Jul. 2, 2002

(54) IMAGE RECORDING/REPRODUCING APPARATUS, AN IMAGE RECORDING APPARATUS, AND AN IMAGE RECORDING METHOD

(75) Inventor: Kazuhiko Taira, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/215,243

(22) Filed: Dec. 18, 1998

(30) Foreign Application Priority Data

Dec. 22, 1997 (JP) ................................. 9-353495

(51) Int. Cl.[7] .............................................. H04N 5/781
(52) U.S. Cl. ............................... 386/70; 386/83; 386/95; 386/98; 386/125
(58) Field of Search ................................ 386/1, 45, 83, 386/95, 98, 111, 112, 126, 125, 46, 69–70; 348/423.1; H04N 5/76, 5/92, 5/781

(56) References Cited

U.S. PATENT DOCUMENTS

| | | | | |
|---|---|---|---|---|
| 5,895,124 A | * | 4/1999 | Tsuga et al. | 386/98 |
| 6,088,507 A | * | 7/2000 | Yamauchi et al. | 386/95 |
| 6,118,927 A | * | 9/2000 | Kikuchi et al. | 386/111 |
| 2001/0053281 A1 | * | 12/2001 | Kashiwagi et al. | 386/95 |

FOREIGN PATENT DOCUMENTS

JP 10-4535 1/1998

* cited by examiner

*Primary Examiner*—Thai Tran
(74) *Attorney, Agent, or Firm*—Pillsbury Winthrop LLP

(57) ABSTRACT

Title screen data generated by multi-layering additional image information as sub-image data, which is to be superposed on a title screen of a program, onto main image data which forms the title screen of the program, and data representing a recording start position of each program on an optical disk are recorded on the optical disk. During reproduction, selection and search of programs to be reproduced are carried out based on title screen data and recording start position data read from the optical disk.

19 Claims, 9 Drawing Sheets

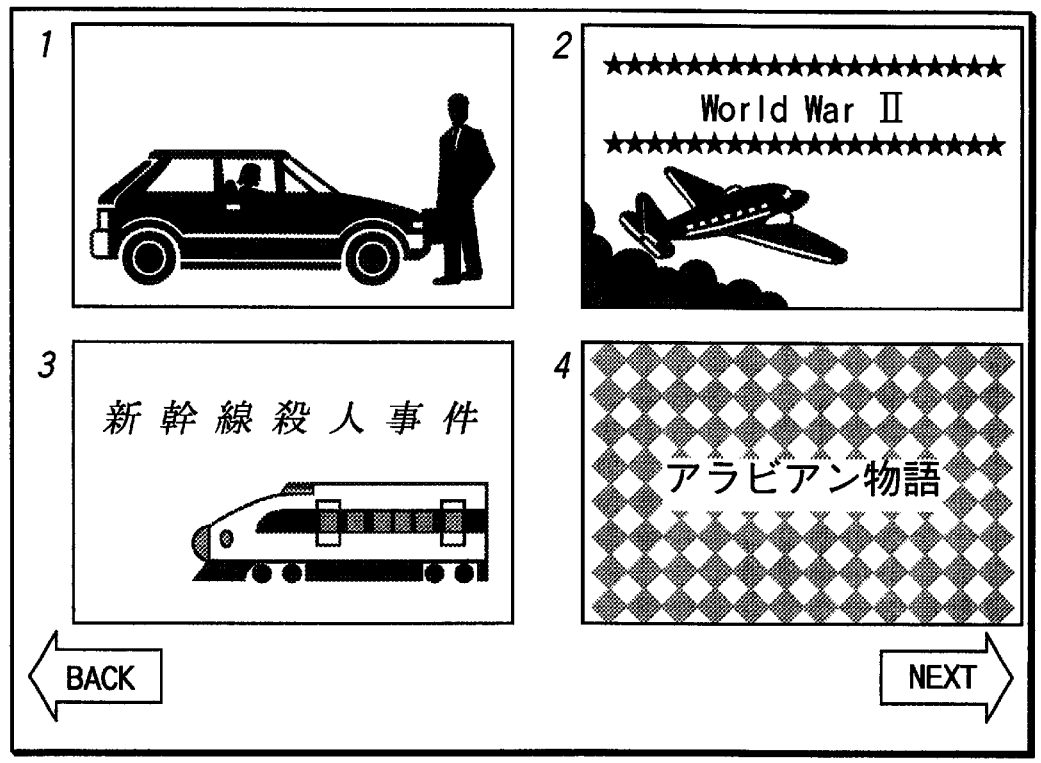
FIG. 7
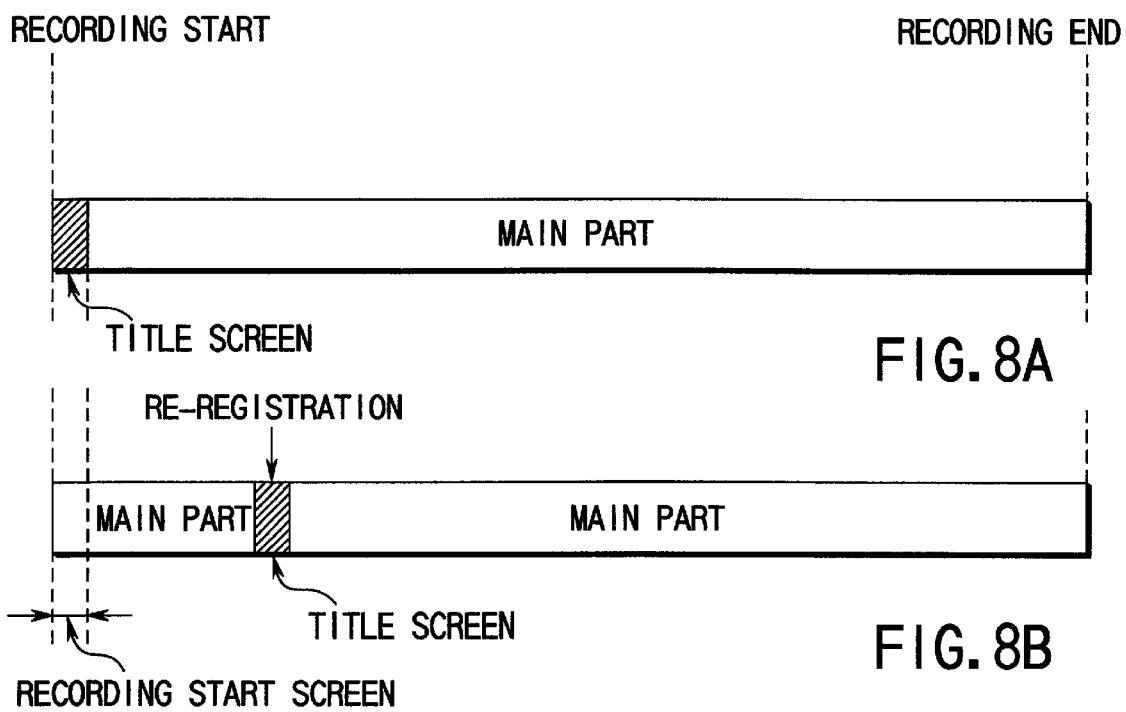
FIG. 8A
FIG. 8B

| PROGRAM RESERVATION CODE | RESERVATION START DATE AND TIME/CHANNEL | GENRE/ PROGRAM NAME |
|---|---|---|
| 0 1 2 3 4 5 6 7 8 | 97/09/02 : ch-11 | DRAMA : URBAN STORY |
| 5 4 9 8 5 2 5 6 1 | 97/09/08 : ch-99 | MOVIE : WORLD WAR II |
| ⋮ | ⋮ | ⋮ |

IMAGE RECORDING/REPRODUCING APPARATUS, AN IMAGE RECORDING APPARATUS, AND AN IMAGE RECORDING METHOD

BACKGROUND OF THE INVENTION

The present invention relates to an improvement of an image recording/reproducing apparatus which records/reproduces image data with respect to a recording medium capable of recording a large amount of data. The present invention also relates to an improvement of an image recording apparatus and an image recording method for recording image data onto a recording medium capable of recording a large amount of data.

As is well known, an optical disk is spreading widely as a recording medium for digital data in various fields in recent years. The optical disk tends to attain a larger capacity in accordance with improvements of performance of an optical head depending on developments of a laser beam having a short wavelength as well as progress of a high-density recording technique and data compression technique, at present. The recordable data amount increases greatly.

For example, in case of a CD (Compact Disk), a laser beam having a wavelength of 780 nm is used for a disk having a diameter of 12 cm to record digital data of about 650 MB (Mega Bytes). In contrast, a DVD is capable of recording digital data of 4.7 GB (Giga Bytes) which is as about 7 times large as a CD, by using a laser beam having a wavelength of 650 nm for a disk having the same size as a CD.

Further, the recordable data amount of this kind of optical disk has already been enhanced to record moving picture image data, audio data, and sub-image data representing a caption or the like, which are equivalent as a whole to a movie of two hours on one surface, by using a data compression technique based on MPEG2 (Moving Picture Image Coding Experts Group 2) as an international standard of moving picture image compression of a media integration type.

Meanwhile, the optical disk is not limited to read-only use but developments have been made in a data-writable optical disk such as a DVD-RAM (Random Access Memory). Therefore, it is expected that VCRs (Video Cassette Recorders) using tapes as recording media will be replaced with recording/reproducing apparatuses using the above-mentioned kinds of optical disks as recording media in the future.

If a tape as a recording medium which makes sequential access is substituted by a disk which makes random access, the time required for searching data can be shortened greatly. That is, a VCR generally records VISS flags on a tape when recording data, and the data is reproduced at a high speed to retrieve the VISS flags when searching data, thus to realize head-search.

Therefore, in several cases, a VCR sometimes searches a tape from one end to the other end thereof so that a long time is required to search a target position. In addition, in case where VISS flags are recorded at a plurality of positions on one tape, the VISS flags are searched one after another to retrieve one target position, and therefore, a long time is required for search too.

In contrast, in case of an optical disk, recorded data is divided into units called sectors, and the address of a sector as a target position is registered in a TOC (Table of Contents) region. Therefore, in a recording/reproducing apparatus for an optical disk, an optical head is moved in a radial direction of the optical disk toward a target position when searching data, and rapid search can thus be achieved.

Also, in this kind of recording/reproducing apparatus, even when a plurality of addresses of target positions are registered in the TOC region of the optical disk, only the target position selected by a user can be searched without searching the other target positions if the user selects the address of a predetermined target position. In this respect, rapid search can be realized.

Here, in a recording/reproducing apparatus having a search function with respect to an optical disk as described above, for example, the user inputs a title or the like in form of a character code as data for search, and selects a desired title from a plurality of titles displayed on the screen. Thus, the address of a target position recorded in the TOC region is chosen during the search.

However, in this kind of conventional recording/reproducing apparatus, all titles to be selected by the user are displayed as characters on the screen. Therefore, even if a user records a plurality of programs such as movies, dramas, and the like from television broadcasts onto an optical disk and sets respectively titles for search to the programs, it is difficult to select correctly a program as a target from the plurality of titles displayed on the screen and the user easily makes errors in selection.

BRIEF SUMMARY OF THE INVENTION

Hence, the present invention has been made in consideration of the above situation and has an object of providing an image recording/reproducing apparatus capable of performing easy and precise search by making an arrangement such that a part of images recorded in a recording medium can be set as a title image used for search and a desired program can be selected by viewing the title image.

The present invention also has another object of providing an image recording apparatus and an image recording method which are arranged such that a part of images recorded in a recording medium can be recorded as a title image used for search and a desired program can be easily and correctly searched by viewing the title image.

The image recording/reproducing apparatus according to the present invention relates is aimed to an apparatus records/reproduces a plurality of data streams including main image data and each including constituting a program, with respect to a disk-like recording medium, comprising:

additional image information generating means for generating additional image information to be displayed and superposed on a title screen of the program;

sub-image generation means for converting the additional image information generated by the additional image information generating means into a format of sub-image data;

title screen holding means for holding title screen data obtained by multi-layering the sub-image data generated by the sub-image generating means and the main image data which is to form the title screen of the program;

recording start position holding means for holding data representing recording start positions on the recording medium, with respect to the plurality of programs;

recording means for recording the recording start position data held by the recording start position holding means and the title screen data held by the title screen holding means, into the recording medium; and reproducing means for selecting and searching a program to be reproduced, based on the title screen data and the recording start position data read from the recording medium.

Also, the image recording apparatus according to the present invention is aimed to an apparatus which records a plurality of data streams including main image data and each including constituting a program, with respect to a disk-like recording medium, comprising:

additional image information generating means for generating additional image information to be displayed and superposed on a title screen of the program;

sub-image generation means for converting the additional image information generated by the additional image information generating means into a format of sub-image data;

title screen holding means for holding title screen data obtained by multi-layering the sub-image data generated by the sub-image generating means and the main image data which is to form the title screen of the program;

recording start position holding means for holding data representing recording start positions on the recording medium, with respect to the plurality of programs; and recording means for recording the recording start position data held by the recording start position holding means and the title screen data held by the title screen holding means, into the recording medium.

Further, the image recording method according to the present invention is aimed to a method for recording a plurality of data streams including main image data and each including constituting a program, with respect to a disk-like recording medium, comprising:

an additional image information generating step of generating additional image information to be displayed and superposed on a title screen of the program;

a sub-image generation step of converting the additional image information generated in the additional image information generating step into a format of sub-image data;

a title screen holding step of holding title screen data obtained by multi-layering the sub-image data generated in the sub-image generating step and the main image data which is to form the title screen of the program;

a recording start position holding step of holding data representing recording start positions on the recording medium, with respect to the plurality of programs; and a recording step of recording the recording start position data held by the recording start position holding step and the title screen data held by the title screen holding step, into the recording medium.

According to the structures and method as described above, title screen data generated by multi-layering additional image information as sub-image data, which is to be superposed on a title screen of a program, onto main image data which forms the title screen of the program, and data representing a recording start position of each program on an optical disk are recorded on the optical disk. When reproducing a program, selection and search of programs to be reproduced are carried out based on title screen data and recording start position data read from the optical disk.

Since a part of images recorded in a recording medium is set as a title used for selection of a program and a desired program can be selected by viewing the title depending on the image, a desired program can be searched easily and correctly even if the recording medium is developed to have a large capacity and a large number of programs are recorded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view illustrating examples of displayed title screen files in the embodiment;

FIGS. 8A and 8B are views for respectively explaining two types of programs including positions of title screens different from each other;

DETAILED DESCRIPTION OF THE INVENTION

Figure 1:
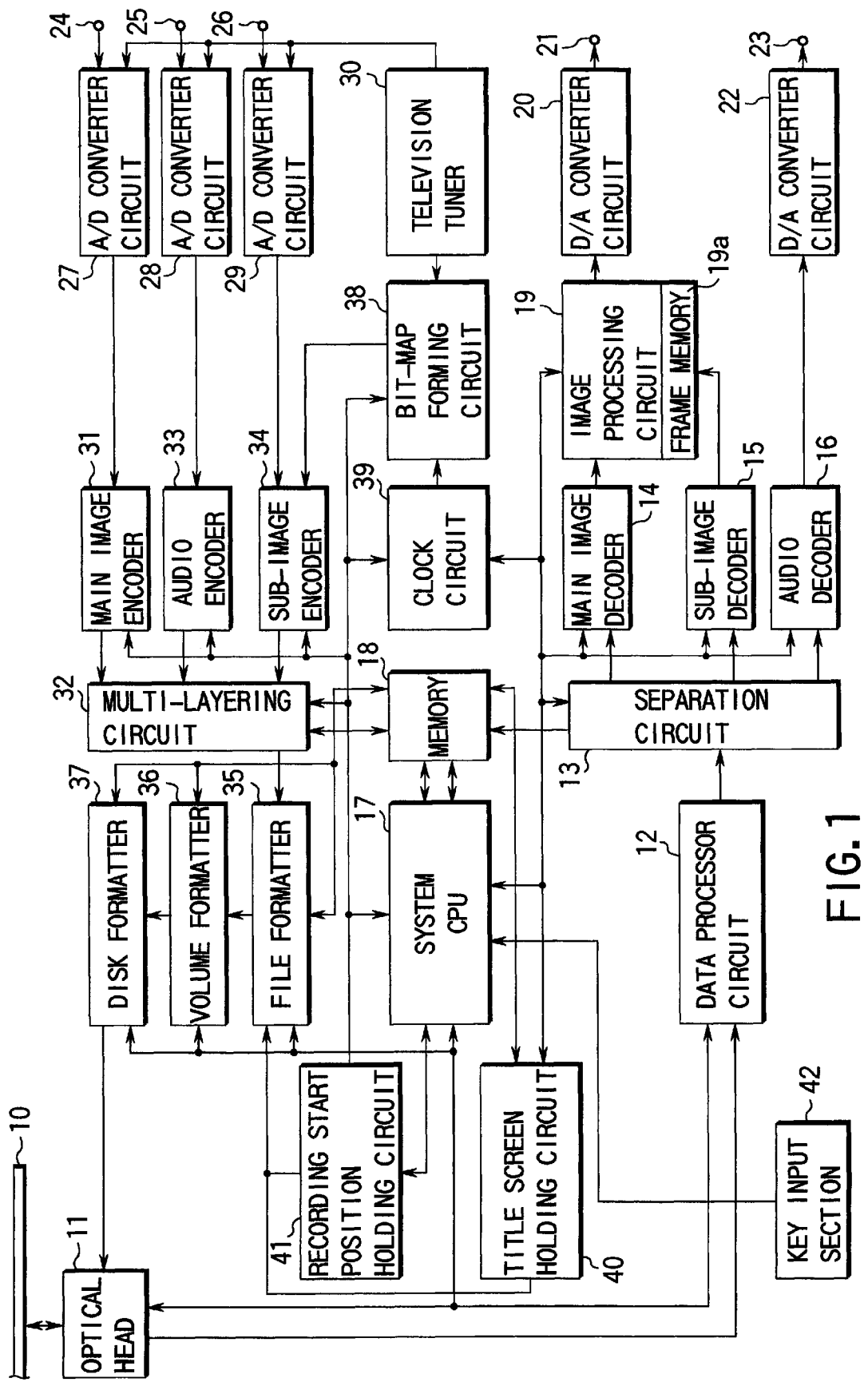
FIG. 1 is a block diagram for explaining an embodiment of an image recording/reproducing apparatus according to the present invention.

In the following, an embodiment of the present invention will be explained in details with reference to the drawings. In FIG. 1, reference 10 denotes an optical disk. Data is read from and written onto the optical disk 10 by an optical head 11. At first, reproducing of the optical disk 10 will be explained below. Data read from the optical disk 10 by the optical head 11 is supplied to a data processor circuit 12 where decoding and error correction processing are performed on the data. The data is thereafter is supplied to a separation circuit 13.

Figure 2:
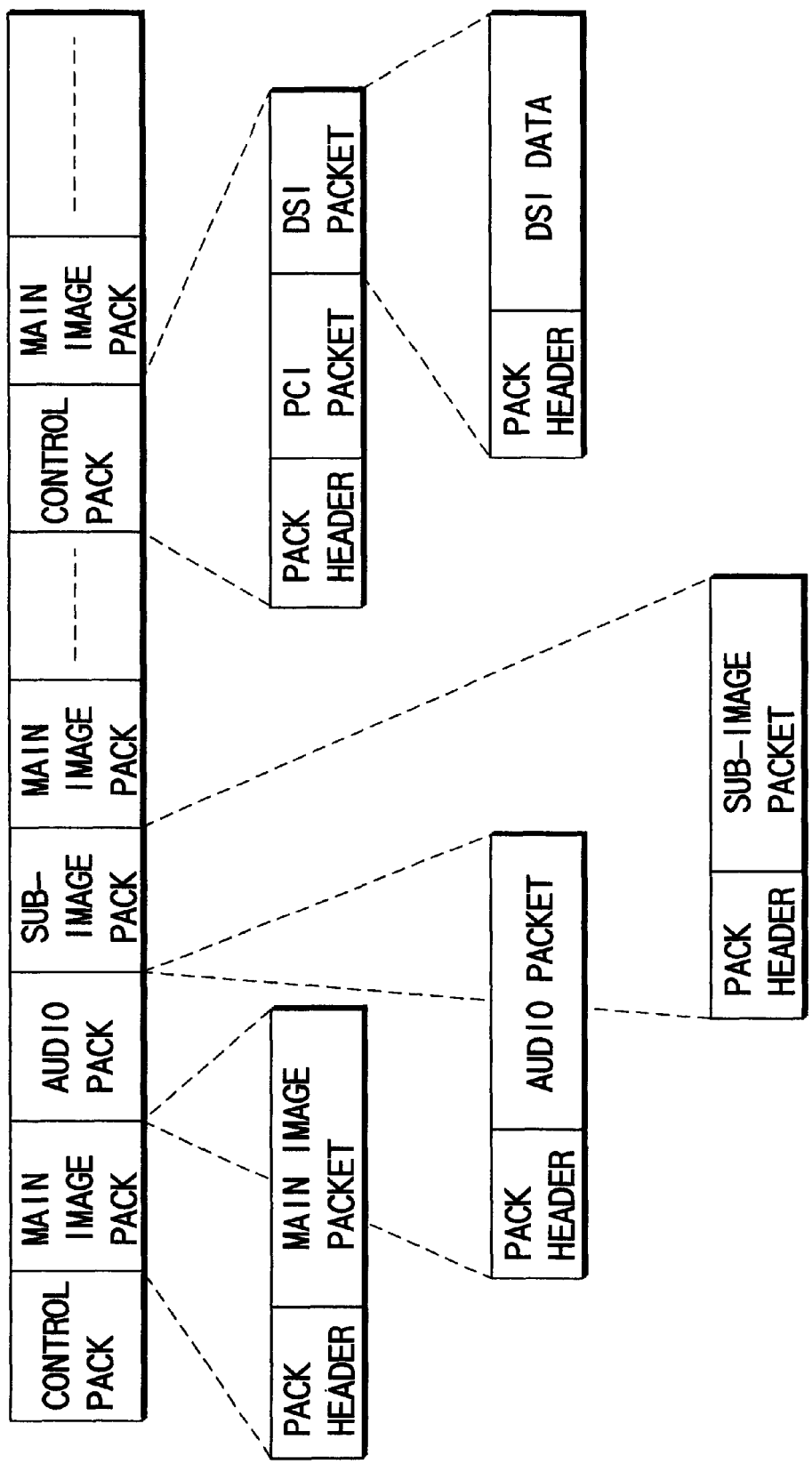
FIG. 2 is a view for explaining a data column of a pack format read from an optical disk in the embodiment.

As shown in FIG. 2, the output from the data processor circuit 12 is a data column of a pack format, which constitutes a program stream of MPEG2 subjected to time-division multiplication. Further, the separation circuit 13 divides an inputted data column into a main image pack consisting of main image data, a sub-image pack consisting of sub-image data, an audio pack consisting of audio data, and a control pack consisting of control data.

Thereafter, the separation circuit 13 refers to the transfer time and ID (Identifier) data included in each of the main image data, sub-image data, audio data, and control data, and transfers the main image data, sub-image data and audio data to the main image decoder 14, sub-image decoder 15, and audio decoder 16, respectively. The separation circuit 13 also transfers the control data to a memory 18 to which a system CPU (Central Processing Unit) 17 can refer.

The main image decoder 14 decodes the inputted main image data and outputs the result to the image processing circuit 19. The sub-image decoder 15 decodes the inputted sub-image data and outputs the result to the image processing circuit 19. The image processing circuit 19 generates image data obtained by mixing the main image data decoded by the main image decoder 14, with the sub-image data decoded by the sub-image data decoder.

Further, the image data generated by the image processing circuit 19 is converted into analogue signals by a D/A (Digital/Analogue) converter circuit 20 and is thereafter supplied through an output terminal 21 to a monitor not shown, to be displayed as an image. The audio decoder 16 described above decodes inputted audio data. The output from the audio decoder 16 is further analogue-converted by the D/A converter circuit 22, and is thereafter supplied via an output terminal 23 to a speaker (not shown) to be outputted as a sound.

Next, data recording onto the optical disk 10 will be explained below. That is, signals corresponding to a main image, an audio, and a sub-image which are to be recorded onto the optical disk 10 are obtained from an external device not shown such as a television receiver or a video camera and are supplied to A/D (Analogue/Digital) converter circuits 27, 28, and 29 through input terminals 24, 25, and 26, respectively.

These A/D converter circuits 27, 28, and 29 digitize the signals inputted through the input terminals 24, 25, and 26 or information signals of a program selected by a television tuner 30 described later.

Further, main image data outputted from the A/D converter circuit 27 is subjected to encoding processing by a main image encoder 31 and is then supplied to a multi-layering circuit 32. In addition, audio data outputted from the A/D converter circuit 28 is subjected to encoding processing by an audio encoder 33 and is then supplied to the multi-layering circuit 32. Also, sub-image data outputted from the A/D converter circuit 29 is subjected to encoding processing by a sub-image encoder 34 and is then supplied to the multi-layering circuit 32.

The multi-layering circuit 32 packets and packs the data of each of the main image, audio wave, and sub-image encoded by the main image encoder 31, audio encoder 33, and sub-image encoder 34, and performs time-divisional multi-layering on the data such that the data in form of main image packs, audio packs, and sub-image packs constitute a program stream of MPEG2.

Further, data columns outputted from the multi-layer circuit 32 are supplied to a file formatter 35 and are converted into a file according to a file configuration which can be recorded and reproduced by the recording/reproducing apparatus. Thereafter, the file is supplied to a volume formatter 36 to form a data format according to a volume structure which can be recorded and reproduced by the recording/reproducing apparatus. The volume formatter 36 adds reproducing control information or the like to data filed by the file formatter 35.

Thereafter, data outputted from the volume formatter 36 is supplied to a disk formatter 37, and the logical format of the data according to the file formatter 35 and the volume formatter 36 is converted into a physical format. The data is then written into the optical disk 10 through the optical head 11.

The television tuner 30 serves to select a desired program from broadcasts received and outputs the channel code thereof. This tuner 30 is incorporated in the recording/reproducing apparatus. The channel code thus outputted from the television tuber 30 is supplied to a bit-map forming circuit 38. The bit-map forming circuit 38 converts an inputted channel code or a date code outputted from a clock circuit 39 for counting date data representing the year, month, date, hour, minute, second, day, and the like, into bit-map data, and outputs the bit-map data to the sub-image encoder 34.

In FIG. 1, reference 40 denotes a title screen holding circuit. The title screen holding circuit 40 temporarily stores a title screen specified automatically or by a user, and outputs the title screen data to the file formatter 35 when performing logical formatter processing.

Further, reference 41 denotes a recording start position holding circuit. The recording start position holding circuit 41 temporarily holds position information concerning a position on the optical disk 10 where recording of a program is started, and outputs the recording start position data to the file formatter 35 when performing logic formatter processing. Reference 42 denotes a key-input section which is operated by a user.

FIG. 2 shows a data column in a pack format, which is outputted after data recorded on the optical disk 10 is read by the optical head 11 and demodulation and error correction processing are performed on the data thus read by a data processor circuit 12.

The pack column includes control packs, main image packs (or packets) containing main image data, audio packs (or packets) containing audio data, and sub-image packs (or packets) containing sub-image data. Except for the control packs, each pack is added with a padding packet which complements the pack in case where the pack does not satisfy a defined pack size.

The control pack consists of a DSI (Data Search Information) packet including search data used for searching data, a PCI (Presentation Control Information) packet including control data with respect to reproduced data.

The control pack also includes information of date and time at which a VOBU (described later) including the control pack is recorded.

Figure 3:
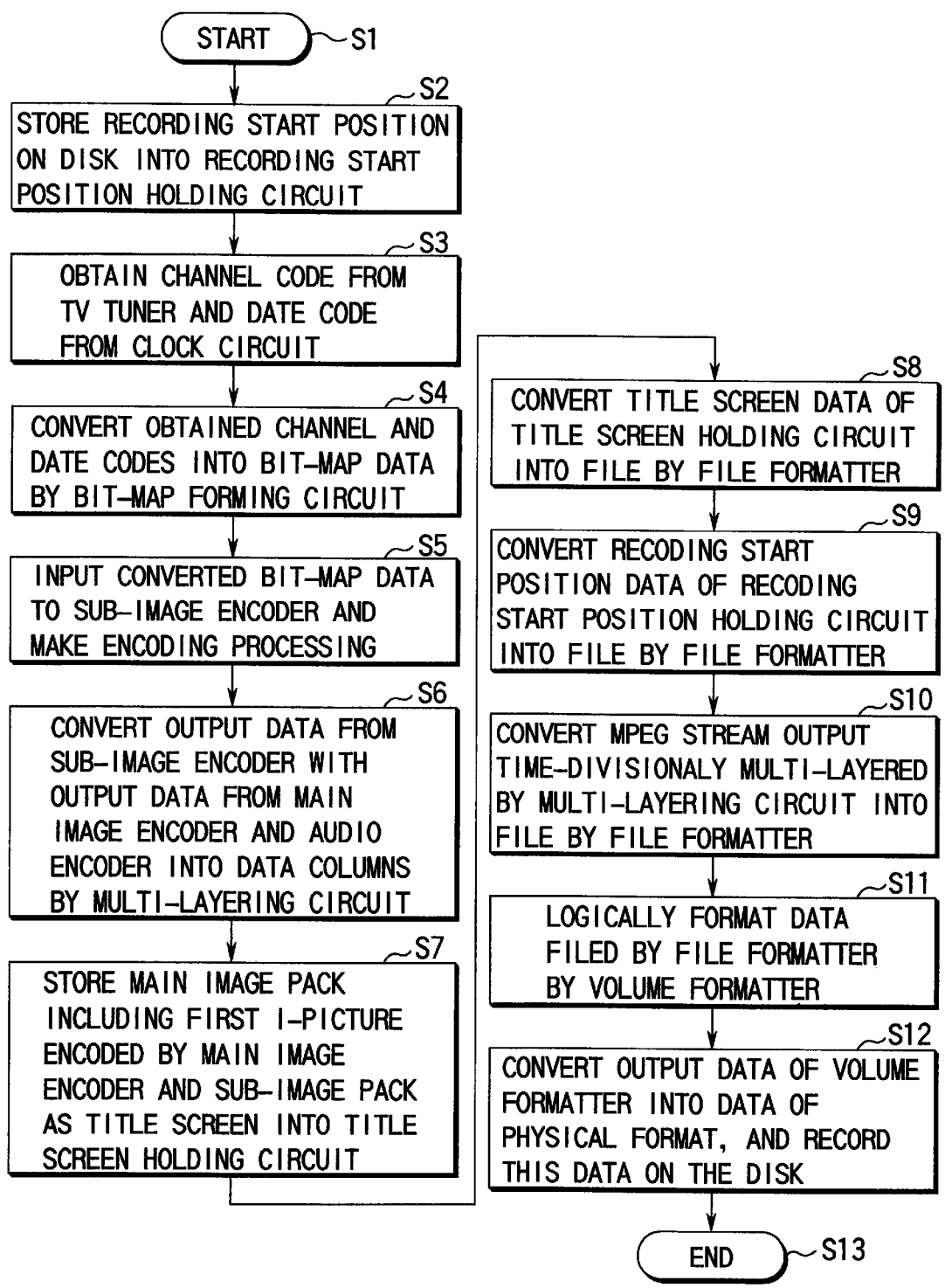
FIG. 3 is a flowchart for explaining procedure of registering a title screen in the embodiment.

FIG. 3 shows a flowchart which explains the procedure of registering a title screen. At first, a recordable/reproducible optical disk 10 is attached to the recording/reproducing apparatus shown in FIG. 1. Also, the system CPU 17 previously obtains various information indicating the contents of recording and the start position of unrecorded region when the power is turned on or the optical disk 10 is attached.

Further, a request for registering a title screen issues from a user and registering of the title screen is started (in a step S1). The system CPU 17 stores the start position of an unrecorded region or the recording start position specified by the user, into the recording start position holding circuit 41 (in a step S2).

Thereafter, when recording of a television program is started in a step S3, the channel code thereof is outputted from the television tuner 30 and date code is outputted from the clock circuit 39. The bit-map forming circuit 38 then converts the inputted channel code and date code into bit-map data in a step S4. In this case, for example, the bit-map forming circuit 38 converts a character code such as "96/07/24 WED." into bit-map data represented in form of 2-bit/1-pixel.

Next, in a step S5, bit-map data generated in the bit-map forming circuit 38 is supplied to the sub-image encoder 34 and is encoded. Thereafter, in a step S6, the data encoded by the sub-image encoder 34 together with the data encoded by each of the main-image encoder 31 and the audio encoder 33 are supplied to the multi-layer circuit 32 and is converted into data in form of the pack/packet format as shown in FIG. 2, thus preparing data columns by time-divisional multi-layering.

Figure 4:
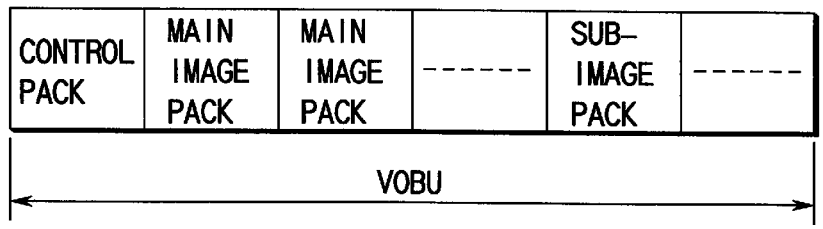
FIG. 4 is a view for explaining a video object unit (VOBU) in the embodiment.

In this case, one same sub-image data containing the date code and the channel code encoded in the step S5 is inserted at a constant interval during recording, e.g., for every VOBU (Video Object Unit) each being a reproducing unit of about 0.5 seconds consisting of several a control pack at the top, several main image packs, an audio pack, and a sub-image pack, as shown in FIG. 4, during recording. Note that the data forming the VOBU includes one to three GOPs (Group of Picture) defined by MPEG.

Further, the system CPU 17 converts at least one main image pack containing an initial I-picture (which is an intra-frame encoded image) by the main image encoder 13 in the step S7, and at least one sub-image pack containing a data code and a channel code encoded in the step S5, into data of VOBU format. The system CPU 17 stores the data as title screen data into the title screen holding circuit 40.

Figure 5:
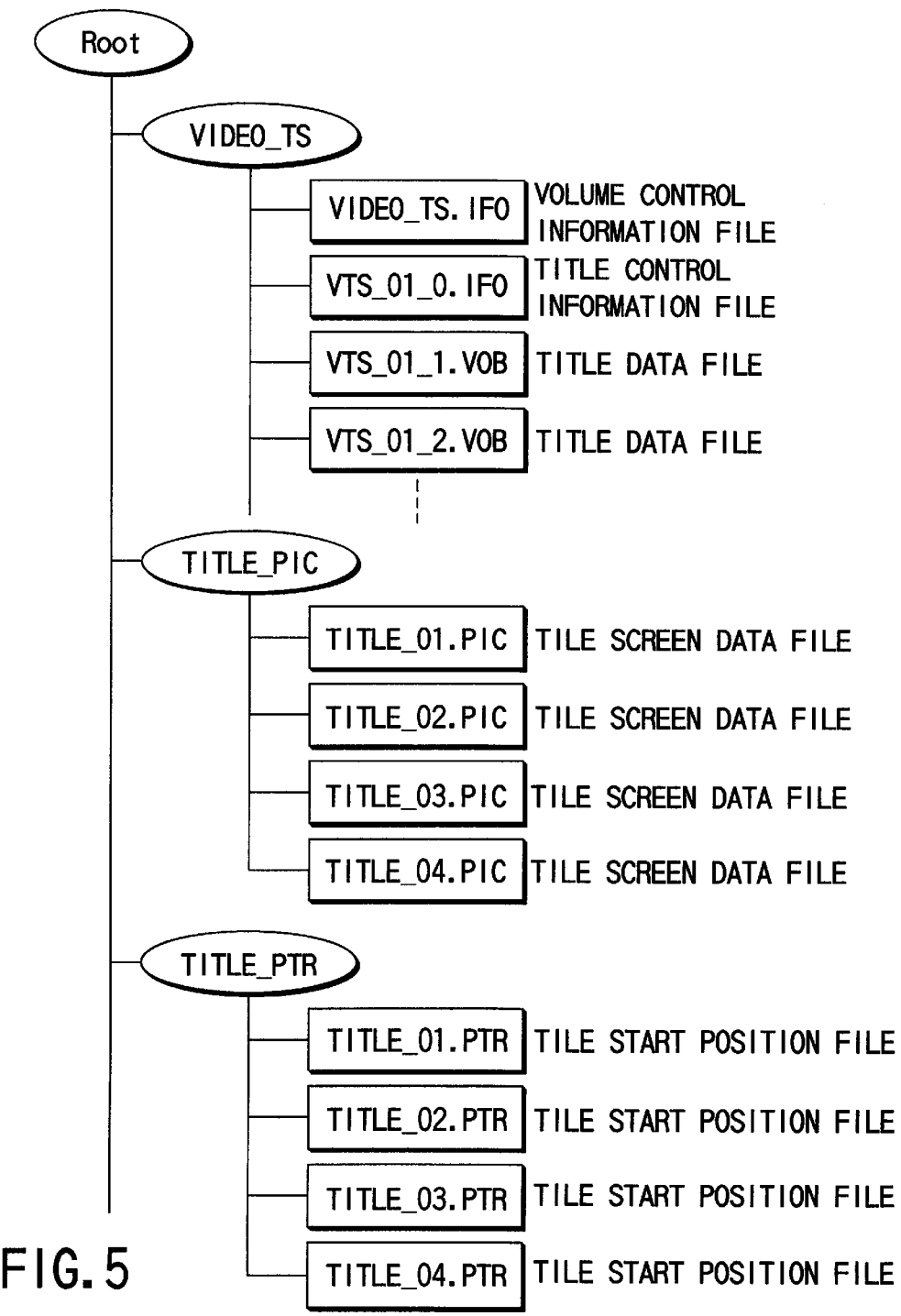
FIG. 5 is a view for explaining a directory configuration of files in the embodiment.

Thereafter, in a step S8, the title screen data stored in the title screen holding circuit 40 is converted into a file such as the file "TITLE_01.PIC" shown in FIG. 5 by the file formatter 35. In addition, in a step S9, the recording start position data stored in the recording start position holding circuit 41 in the step S2 is converted into a file such as the file "TITLE_01.PTR" as shown in FIG. 5 by the file formatter 35. Further, in a step S10, the data column subjected to time-divisional multi-layering by the multi-layering circuit 32 in the step S6 is converted into a file such as the file "VST_01_1.VOB" shown in FIG. 5.

In a step S11, the data converted into a file by the file formatter 35 is set into a directory configuration as shown in FIG. 5 by the volume formatter 36 and is logically formatted so as to match with the recording/reproducing apparatus. In a step S12, a disk formatter 37 converts the data logically formatted by the volume formatter 36 into data in a physical format. The data in the physical format is recorded on the disk 10 by the optical head 11. Thus, the operation of registering a title screen is terminated (in a step S13).

In the operation of recording a title screen as described above, a main image pack and a sub-image pack are recorded in one same file. The present invention is not limited hitherto, but only the sub-image pack may be recorded in a different file and the data thereof can be supplied later to the sub-image decoder 15 by the system CPU 17 to display an image. If the date code and the channel code thus obtained are stored together in a file (TITLE_01.PTR or the like) of the recording start position data, the data can be used for sorting titles depending on dates and channels.

Figure 6:
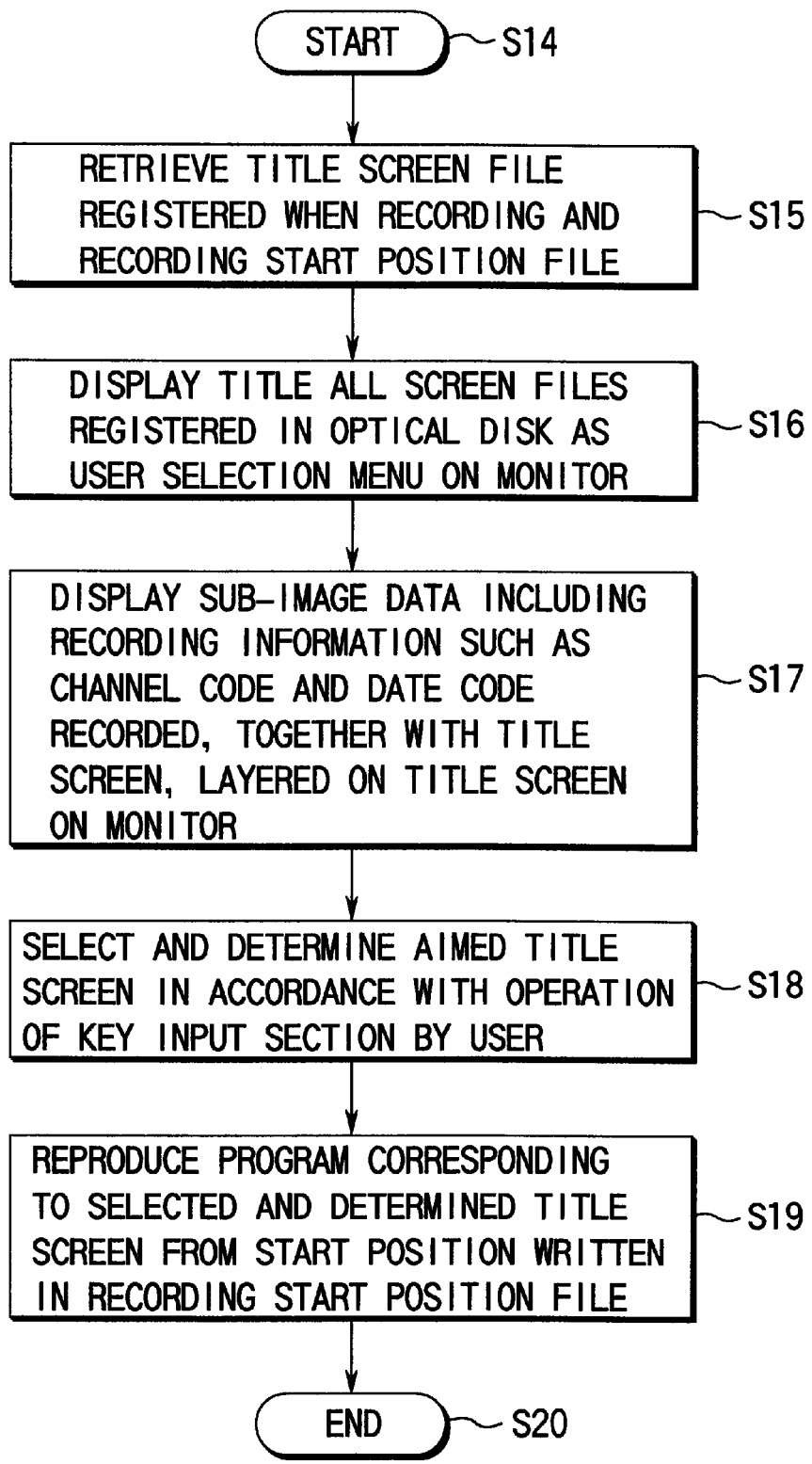
FIG. 6 is a flowchart for explaining reproducing procedure from the optical disk in the embodiment.

FIG. 6 shows a flowchart which explains the procedure of reproducing data in an optical disk 10 in which a title screen is registered as described above. At first, the optical disk 10 is attached to the recording/reproducing apparatus shown in FIG. 1, and the procedure of reproducing data is started (in a step S14). In a step S15, the system CPU 17 reads the contents of the optical disk 10 and retrieves a title screen file (TITLE_01.PIC or the like) and a recording start position file (TITLE_01.PTR or the like) registered in a directory configuration as shown in FIG. 5 during recording.

Further, in a step S16, the system CPU 17 makes all the title screen files registered in the optical disk 10 be displayed as a user selection menu on a monitor. In this case, the system CPU 17 performs suppression on the title screen data to reduce the display size of each title screen to a screen size suitable for attaining multi-screen display on the monitor.

In case where a number of title screen files exist and cannot be contained in one screen even by multi-screen display, the menu configuration is arranged such that a plurality of screens each containing four title screens are generated as shown in FIG. 7 and are selectively switched to be displayed.

In a step 17, sub-image data which includes recording information such as a channel code and a date code recorded together with a title screen and which can be displayed and layered on the title screen is let be displayed simultaneously on the monitor, by the system CPU 17.

The user thereafter operates, for example, numeral keys and the like to select an aimed title screen and makes a determination by operating an enter key in a step S18. The system CPU 17 then reproduces a program corresponding to the title screen selected and determined by the user from the start position described in the recording start position file, in a step S19. The procedure is thus terminated (in a step S20).

The directory configuration shown in FIG. 5 will now be explained below. Under the layer of the root directory, there are three directories of "VIDEO_TS", "TITLE_PIC", and "TITLE_PTR". The directory of "VIDEO_TS" includes an information file of "VIDEO_TS.IFO" which records control information and the like concerning all the titles recorded in the optical disk 10, an information file "VTS_01_0.IFO" which records control information and the like concerning the titles themselves, and data files "VTS_01_1.VOB" and "VTS_01_2.VOB" as reproducing data of the titles themselves.

The directory of "TITLE_PIC" includes title screen data files "TITLE_01.PIC" and "TITLE_02.PIC" which are title screen data registered by the present recording/reproducing apparatus. Further, the directory of "TITLE_PTR" includes recording position data files "TITLE_01.PTR", "TITLE_02.PTR" which respectively describe recording start positions of programs corresponding to title screens registered in the directory "TITLE_PIC".

Meanwhile, various broadcasted programs such as movies, dramas, and the like are divided into types A and B. In the program of the type A, as shown in FIG. 8A, the title screen is displayed at the start of broadcasting of the program. In the program of the type B, as shown in FIG. 8B, the title screen is displayed during broadcasting of the program. As for the program of the type A, the recording start screen is a title screen and therefore allows a user to recognize easily what the program is, even if a screen automatically registered at the start of recording is directly used as for menu display.

In contrast, as for the program of the type B, the main part of the program abruptly and the title screen is displayed in the middle of the program. The main part thereafter continues following the title screen. The recording start screen of this type of program is thus a screen cut of the main part of the program. Therefore, it is difficult to identify what the program is if a screen automatically registered at the start of recording is directly used for menu display.

Hence, an arbitrary screen desired to be registered as a title screen (e.g., a title screen part or the like of a movie or drama) is instructed by a user by operating a key input section 42 during recording of a program or reproducing of a recorded program and can be registered into the optical disk 10 by thus updating a title screen data file (TITLE_01.PIC or the like) automatically registered at the start of recording.

In this case, the title screen can be freely selected and updated. However, the data file (TITLE_01.PTR or the like) indicating the recording start position of the program is arranged so as not to update the data at the start of recording but to maintain the data. This manner is effective for a program which abruptly starts from its main part and displays its title screen several minutes later.

Even if a broadcast station sends broadcast signals added with a signal as a trigger for starting display of a title screen in the future, automatic registration of such a title screen can be performed regardless of the type A or B of the program in such a manner that the system CPU 17 automatically issues a registration instruction when the television tuner 30 detects the trigger signal.

The data column which constitutes a title screen previously shown in FIG. 4 will now be explained. A title screen is prepared as at least one VOBU each based on a reproducing unit of about 0.5 second. The VOBU has a configuration in which a control pack is arranged at the top and a plurality of main image packs and at least one sub-image pack are arranged subsequently.

The control pack consists of a DSI packet containing search information used for data search and a PCI packet containing control information with respect to reproducing data. In addition, the main image pack always contains a I-picture as an in-frame encoding image constituting the title screen. Further, the sub-image pack contains an channel code and a date code both encoded.

As for the title screen data formed in the configuration as shown in FIG. 4, a still image is obtained by reproducing only the I-picture during reproducing, and a moving picture is obtained by reproducing a plurality of VOBUs for a certain time. In addition, the title screen can be formed only of one frame (I-picture).

Next, generation of the menu screen previously shown in FIG. 7 will now be explained below. For example, suppose that the four title screen data files "TITLE_01.PIC" to "TITLE_04.PIC" shown in FIG. 5 are respectively registered as title screens showing a car at No. 1, an air plane at No. 2, Shinkansen at No. 3, and a character title at No. 4 in FIG. 7, in the optical disk 10.

In the recording/reproducing apparatus, when this optical disk 10 is attached, the system CPU 17 recognizes the number of files (or titles) recorded therein and stores data read through the data processor circuit 12, into the memory 18. Further, main image data and sub-image data obtained from the separation circuit 13 are respectively subjected to decoding processing by the main image decoder 14 and the sub-image decoder 15, respectively. Thereafter, image data is suppressed and developed on a frame memory 19a included in the image processing circuit 19.

As a result of this, the menu screen as shown in FIG. 7 is generated and is displayed as an image on the monitor. In this time, the title numbers are displayed simultaneously by OSD (On Screen Display).

Figure 9:
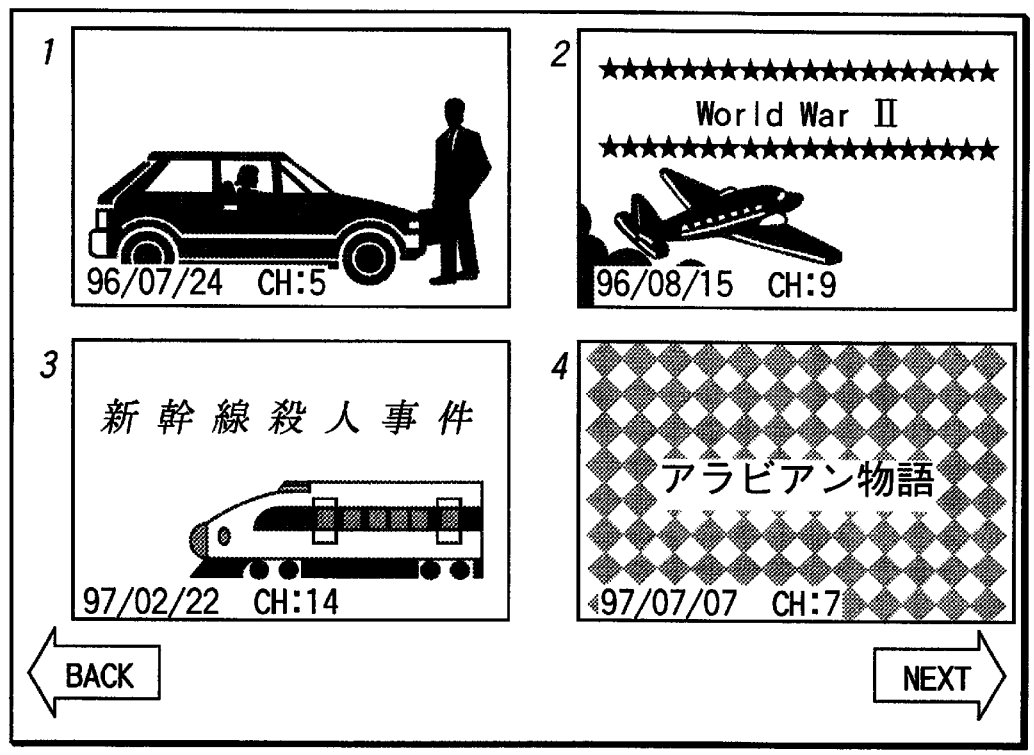
FIG. 9 is a view illustrating other examples of displayed title screen files in the embodiment.

FIG. 9 shows a case in which sub-image data is effective in FIG. 7. Dates and channels are thus displayed and layered over title screens, respectively, so that it is possible to know when programs were recorded at what channels.

In additions still image reproducing depending on I-pictures or moving image reproducing in units of VOBUs is carried out depending on by searching top data for every title without using of title screen data files (TITLE_01.PIC and the like) registered in the directory configuration as shown in FIG. 5 but with use of a recording start position file (TITLE_01.PTR or the like). The menu screen as shown in FIG. 7 or 9 can thus be constructed.

Figure 10:
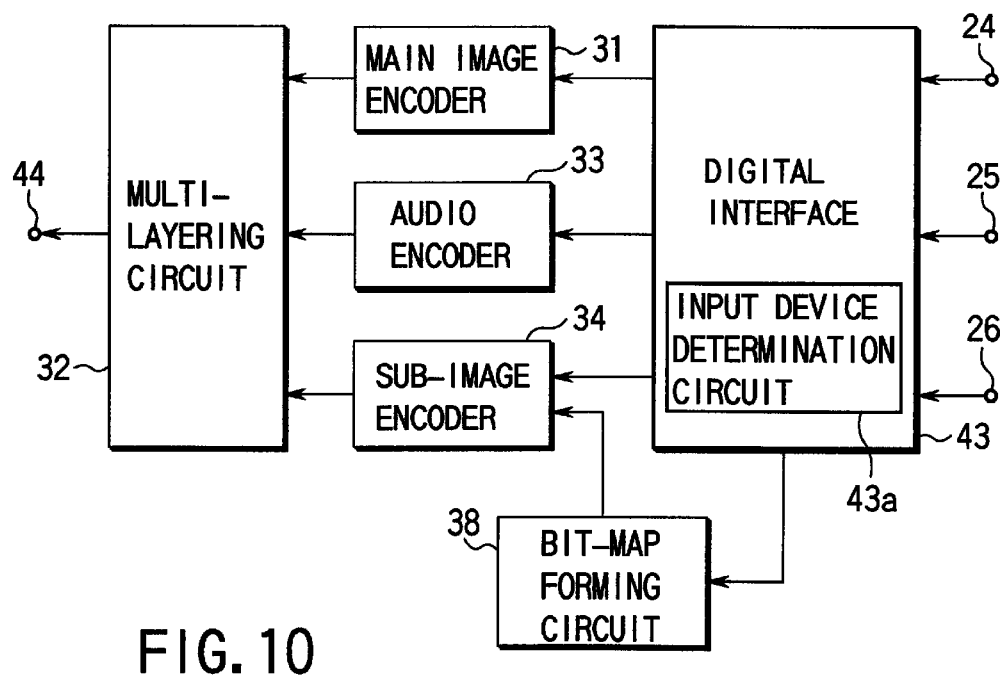
FIG. 10 is a block diagram for explaining a modification of a part of the embodiment.

Next, FIG. 10 shows a modification of the embodiment described above. To explain FIG. 10, those components that are the same as those shown in FIG. 1 will be referred to by same references, input terminals 24, 25, and 26 are respectively supplied with digital data corresponding to main images, audio waves, and sub-images. The digital data is obtained from various input digital sources such as cable/non-cable digital television broadcast, a digital video camera, a personal computer, a digital VCR, and the like.

The digital data supplied to the input terminals 24, 25, and 26 is respectively supplied to a main image encoder 31, an audio encoder 33, and a sub-image encoder through a digital interface 43 of IEEE (The Institute of Electrical and Electronics Engineers, Inc.) 1394, and is outputted through a multi-layering circuit 32 and an output terminal 44, to the file formatter 35 as described previously.

The digital interface 43 includes an input device determination circuit 43a for making an identification determination as to digital devices connected to the input terminals 24, 25, and 26. The input device determination circuit 43a receives an identification code from a connected digital device through the digital interface 43, thereby to make an identification determination as to the device.

For example, supposing that the connected digital device is a digital VCR, the input device determination circuit 43a performs an identification determination and thereafter outputs identification information representing that a digital VCR is connected, to a bit-map forming circuit 38. Then, the bit-map forming circuit 38 prepares bit-map data such as "VCR" or the like based on the inputted identification information and outputs the bit-map data to a sub-image encoder 34.

Further, the bit-map data is subjected to encoding processing by a sub-image encoder 34 and is thereafter multi-layered together with main image data and audio data by a multi-layering circuit 32. Therefore, the kind of the digital device which serves as an input source can be displayed as a sub-image in the title screen.

Figure 11:
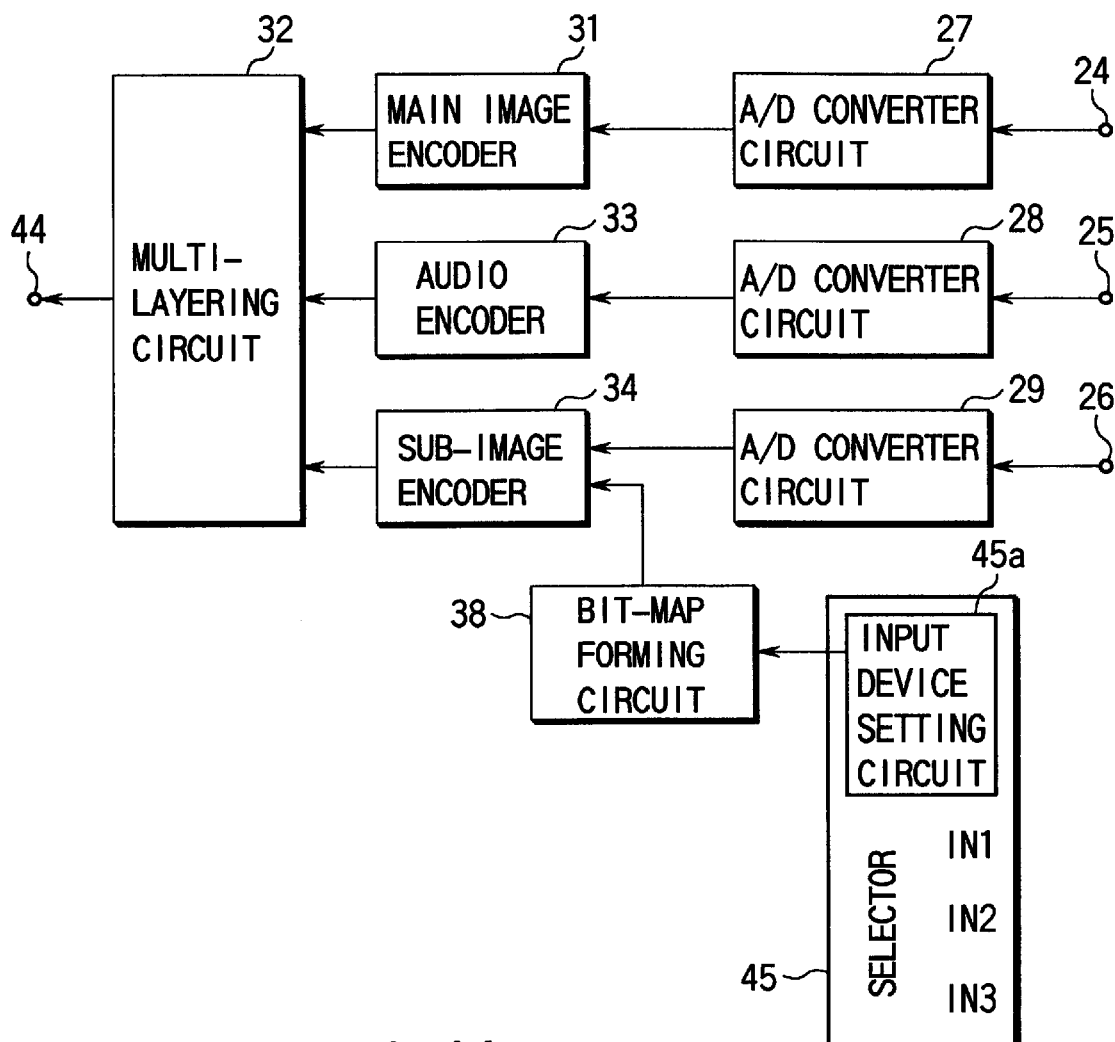
FIG. 11 is a block diagram for explaining another modification of a part of the embodiment.

FIG. 11 shows another modification of the embodiment described previously. To explain FIG. 11 in which those components that are the same as those shown in FIG. 1 will be referred to by same references, analogue signals corresponding to main images, audio waves, and sub-images are selectively supplied to input terminals 24, 25, and 26 from a plurality of input analogue sources (or three in this case) by a selector 45.

For example, the selector 45 has an input end IN1 supplied with an analogue signal outputted from a LD (Laser Disk) player, an input end IN2 supplied with an analogue signal outputted from an analogue VCR, and an input end IN3 supplied with an analogue signal outputted from an analogue video camera.

A user sets names of analogue devices connected to the input ends IN1, IN2, and IN3 to an input device setting circuit 45a included in the selector 45. For example, setting is IN1:"LD", IN2:"VCR", IN3:"CAMERA".

When the user selects the input end IN1, analogue signals obtained from the LD player are supplied to the input terminals 24, 25, and 26 and a character co de of "LD"is outputted to a bit-map forming circuit 38 from the input device setting circuit 45a. Then, the bit-map forming circuit 38 prepares bit-map data of "LD "based on the inputted character code and outputs the bit-map data to a sub-image encoder 34.

Further, the bit-map data is subjected to encoding processing by the sub-image encoder 34 and is thereafter multi-layered together with main image data and audio data by a multi-layering circuit 32. The multi-layered data is subjected to various formatter processing and thereafter recorded onto the optical disk 10. Therefore, the kind of the analogue device which serves as an input source is displayed as a sub-image on the title screen.

Figures 12, 13:
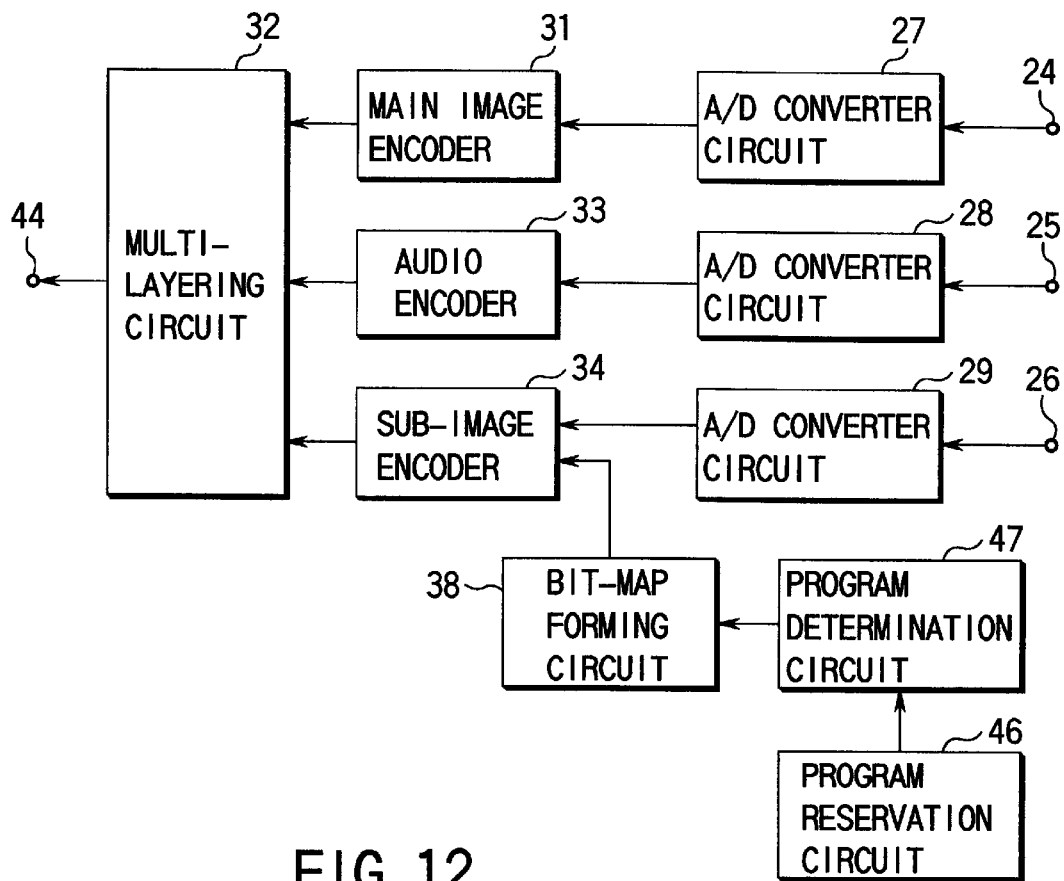
FIG. 12 is a block diagram for explaining further another modification of a part of the embodiment.
FIG. 13 shows a table in which program reservation codes are associated so as to correspond to contents thereof in the modification shown in FIG. 12.

FIG. 12 shows further another modification of the embodiment described previously. In the following explanation of FIG. 12, those components that are the same as those shown in FIG. 1 will be referred to by same references. When a reservation code of a program which a user desires to record is set in a program reservation section 46 by the user, a program determination circuit 47 determines the recording start time, channel, and program name thereof from the reservation code, and outputs character information thereof to the sub-image encoder 34, associated with the program to be recorded.

Further, the bit-map data is subjected to encoding processing by the sub-image encoder 34 and is thereafter multi-layered together with main image data and audio data by a multi-layering circuit 32. The multi-layered data is subjected to various formatter processing and is thereafter recorded onto the optical disk 10. Therefore, if only a user sets a reservation code of a program which the user desires to record, the data, channel, and program name thereof are displayed as a sub-image on the title screen.

FIG. 13 is a table showing reservation codes respectively applied to programs, recording start times and channels corresponding thereto, genres of the programs, and program names. The table is previously registered in the optical disk 10 in some cases or is supplied through a communication means in other cases. In the cases where such a table is supplied through a communication means, the table is stored into a memory 18.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recording/reproducing apparatus for recording/reproducing a plurality of data streams including main image data and each including constituting a program, with respect to a disk-like recording medium, comprising:

additional image information generating means for generating additional image information to be displayed and superposed on a title screen of the program;

sub-image generation means for converting the additional image information generated by the additional image information generating means into a format of sub-image data;

title screen holding means for holding title screen data obtained by multi-layering the sub-image data generated by the sub-image generating means and the main image data which is to form the title screen of the program;

recording start position holding means for holding data representing recording start positions on the recording medium, with respect to the plurality of programs;

recording means for recording the recording start position data held by the recording start position holding means and the title screen data held by the title screen holding means, into the recording medium; and reproducing means for selecting and searching a program to be reproduced, based on the title screen data and the recording start position data read from the recording medium.

2. The apparatus according to claim 1, wherein the additional image information generating means comprises at least one of:

clock means for obtaining information representing, as the additional image information, date of a time point when recording of the program is started;

a television tuner for obtaining, as the additional image information, information representing a television broadcast channel of the program to be recorded onto the recording medium;

input source determination means for obtaining information representing an input source of the program to be recorded onto the recording medium; and reserve program determination means for obtaining, as the additional image information, information concerning the program which is preserved to be recorded onto the recording medium.

3. The apparatus according to claim 2, wherein the clock means converts a date code into bit-map data and outputs the bit-map data to the sub-image generating means.

4. The apparatus according to claim 2, wherein the television tuner converts a channel code into bit-map data and outputs the bit-map data to the sub-image generating means.

5. The apparatus according to claim 2, wherein the input source determination means determines an input source, based on an identification code supplied from a digital device connected, converts identification information corresponding to the input source determined, into bit-map data, and outputs the bit-map data to the sub-image generating means.

6. The apparatus according to claim 2, wherein the input source determination means sets identification character codes for a plurality of analogue devices connected, respectively, converts a character of an analogue device selected into bit-map data, and outputs the bit-map data to the sub-image generating means.

7. The apparatus according to claim 2, wherein the reservation program determination means has a table in which a reservation code of a program is associated so as to correspond to character information of the program represented by the reservation code, converts the character information corresponding to a reservation code, into bit-map data, and outputs the bit-map data to the sub-image generating means.

8. The apparatus according to claim 1, wherein the title screen holding means automatically multi-layers main image data at a recording start position when recording of a program onto the recording medium is started, and sub-image data generated by the sub-image generating means, thereby to generate and hold title screen data.

9. The apparatus according to claim 8, wherein the title screen holding means multi-layers main image data in the program specified by external operation and sub-image data generated by the sub-image generating means, thereby to generate title screen data and to hold the title screen data generated and based on the image data at the recording start position of the program in place of the title screen data.

10. The apparatus according to claim 1, wherein the reproducing means includes:
   display means for displaying the title screens of the plurality of programs recorded on the recording medium, as a menu for selecting a program, by multi-screen display, based on title screen data read from the recording medium;
   selection means for selecting a desired title screen by external operation, from the title screens of the plurality of programs displayed by the display means by the display means; and
   search means for searching a start position on the recording medium with respect to a program corresponding to the desired title screen selected by the selection means, based on recording start position data read from the recording medium.

11. The apparatus according to claim 10, wherein the display means generates a plurality of screens each of which displays a plurality of title screens by multi-screen display, if a plurality of title screens recorded on the recording medium cannot be included in one screen.

12. An image recording apparatus for recording a plurality of data streams including main image data and each including constituting a program, with respect to a disk-like recording medium, comprising:
   additional image information generating means for generating additional image information to be displayed and superposed on a title screen of the program;
   sub-image generation means for converting the additional image information generated by the additional image information generating means into a format of sub-image data;
   title screen holding means for holding title screen data obtained by multi-layering the sub-image data generated by the sub-image generating means and the main image data which is to form the title screen of the program;
   recording start position holding means for holding data representing recording start positions on the recording medium, with respect to the plurality of programs; and
   recording means for recording the recording start position data held by the recording start position holding means and the title screen data held by the title screen holding means, into the recording medium.

13. The apparatus according to claim 12, wherein the additional image information generating means comprises at least one of:
   clock means for obtaining information representing, as the additional image information, date of a time point when recording of the program is started;
   a television tuner for obtaining, as the additional image information, information representing a television broadcast channel of the program to be recorded onto the recording medium;
   input source determination means for obtaining information representing an input source of the program to be recorded onto the recording medium; and
   reserve program determination means for obtaining, as the additional image information, information concerning the program which is preserved to be recorded onto the recording medium.

14. The apparatus according to claim 12, wherein the title screen holding means automatically multi-layers main image data at a recording start position when recording of a program onto the recording medium is started, and sub-image data generated by the sub-image generating means, thereby to generate and hold title screen data.

15. The apparatus according to claim 14, wherein the title screen holding means multi-layers main image data in the program specified by external operation and sub-image data generated by the sub-image generating means, thereby to generate title screen data and to hold the title screen data generated and based on the image data at the recording start position of the program in place of the title screen data.

16. An image recording method for recording a plurality of data streams including main image data and each including constituting a program, with respect to a disk-like recording medium, comprising:
   an additional image information generating step of generating additional image information to be displayed and superposed on a title screen of the program;
   a sub-image generation step of converting the additional image information generated in the additional image information generating step into a format of sub-image data;
   a title screen holding step of holding title screen data obtained by multi-layering the sub-image data generated in the sub-image generating step and the main image data which is to form the title screen of the program;
   a recording start position holding step of holding data representing recording start positions on the recording medium, with respect to the plurality of programs; and
   a recording step of recording the recording start position data held by the recording start position holding step and the title screen data held by the title screen holding step, into the recording medium.

17. The method according to claim 16, wherein the additional image information generating step includes, as the additional image information, at least one of:
   information representing date of a time point when recording of the program onto the recording medium is started;
   information representing a television broadcast channel of the program to be recorded onto the recording medium;
   information representing an input source of the program to be recorded onto the recording medium; and
   information concerning the program which is preserved to be recorded onto the recording medium.

18. The method according to claim 16, wherein in the title screen holding step, main image data at a recording start position when recording of a program onto the recording medium is started and sub-image data generated by the sub-image generating step are automatically multi-layered, thereby to generate and hold title screen data.

19. The method according to claim 18, wherein in the title screen holding step, main image data in the program specified by external operation and sub-image data generated by the sub-image generating means are multi-layered, thereby to generate title screen data and to hold the title screen data generated and based on the image data at the recording start position of the program in place of the title screen data.

* * * * *